(12) United States Patent
Ishiyama et al.

(10) Patent No.: US 12,516,957 B2
(45) Date of Patent: Jan. 6, 2026

(54) INFORMATION CONTROL DEVICE USING INFORMATION DETECTED BY VEHICLE AND MOBILE DEVICE

(71) Applicant: TOYOTA JIDOSHA KABUSHIKI KAISHA, Toyota (JP)

(72) Inventors: Kuka Ishiyama, Musashino (JP); Yasuhiro Ishiguro, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 18/519,694

(22) Filed: Nov. 27, 2023

(65) Prior Publication Data

US 2024/0263966 A1 Aug. 8, 2024

(30) Foreign Application Priority Data

Feb. 7, 2023 (JP) .................................. 2023-017163

(51) Int. Cl.
*G01C 21/00* (2006.01)

(52) U.S. Cl.
CPC ................................ *G01C 21/3889* (2020.08)

(58) Field of Classification Search
CPC .................................................. G01C 21/3889
See application file for complete search history.

(56) References Cited

U.S. PATENT DOCUMENTS

| | | | | |
|---|---|---|---|---|
| 6,564,127 B1* | 5/2003 | Bauerle | ................... | H04W 8/20 340/991 |
| 2014/0047347 A1* | 2/2014 | Mohn | ...................... | G07C 7/00 715/738 |
| 2014/0270345 A1* | 9/2014 | Gantman | ................... | G01S 5/16 382/103 |
| 2015/0046022 A1* | 2/2015 | Bai | ......................... | G07C 5/008 701/461 |
| 2016/0078140 A1* | 3/2016 | Chen | ................... | G06F 16/9535 701/532 |
| 2016/0088422 A1* | 3/2016 | Foster | ..................... | H04W 4/20 455/41.2 |
| 2016/0099876 A1* | 4/2016 | Oezdemir | ......... | H04W 28/0215 709/202 |
| 2016/0116291 A1* | 4/2016 | Chien | .................... | G01C 21/26 701/519 |
| 2018/0059913 A1* | 3/2018 | Penilla | ................ | H04W 12/068 |
| 2018/0242190 A1* | 8/2018 | Khoryaev | ............... | H04W 4/40 |

(Continued)

FOREIGN PATENT DOCUMENTS

| | | |
|---|---|---|
| JP | 2015-127674 A | 7/2015 |
| JP | 2021-195004 A | 12/2021 |

*Primary Examiner* — Jess Whittington
(74) *Attorney, Agent, or Firm* — SoraIP, Inc.

(57) ABSTRACT

In the mobile device, the processing execution unit performs processing using sensor information detected by the sensor. Also, in the vehicle, a signal including sensor information detected by a sensor is transmitted from a transmission device. In the information control device, the reception device of the acquisition unit receives the signal transmitted from the transmission device. When the reception device is stably receiving the signal, the signal stability determination unit inputs sensor information included in the received signal the process execution unit instead of the sensor information from the sensor. As a result, the sensor information detected by the vehicle sensors can be effectively used in the mobile device.

2 Claims, 5 Drawing Sheets

(56) References Cited

U.S. PATENT DOCUMENTS

| | | | |
|---|---|---|---|
| 2020/0149893 A1* | 5/2020 | Xu | G01C 21/28 |
| 2020/0249822 A1* | 8/2020 | Penilla | G06F 3/0488 |
| 2020/0296545 A1* | 9/2020 | Dingli | G08B 21/0247 |

* cited by examiner

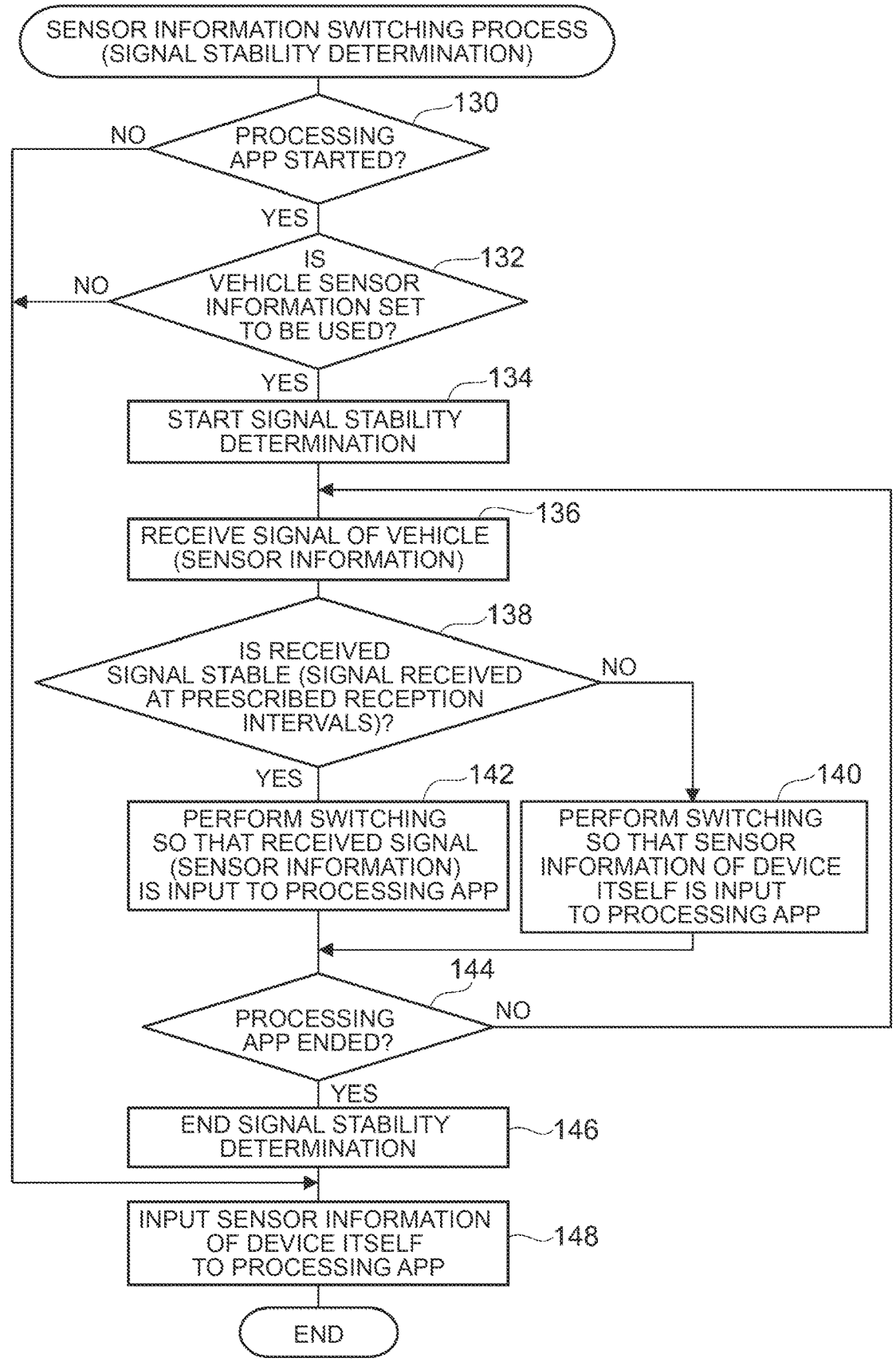

INFORMATION CONTROL DEVICE USING INFORMATION DETECTED BY VEHICLE AND MOBILE DEVICE

CROSS-REFERENCE TO RELATED APPLICATION

This application claims priority to Japanese Patent Application No. 2023-017163 filed on Feb. 7, 2023, incorporated herein by reference in its entirety.

BACKGROUND

1. Technical Field

The present disclosure relates to information control devices that are used between a portable information processing device such as a smartphone and a vehicle.

2. Description of Related Art

Japanese Unexamined Patent Application Publication No. 2021-195004 (JP 2021-195004 A) discloses a vehicle control device. When a mobile device equipped with an acceleration sensor and a gyro sensor is brought into a vehicle, the vehicle control device acquires output signals of the acceleration sensor and the gyro sensor from the mobile device, and uses the acquired output signals to control the attitude of the vehicle.

SUMMARY

Many mobile devices serving as portable information processing devices such as smartphones are equipped with various types of sensors such as a Global Positioning System (GPS) sensor (GPS device) for acquiring location information of the mobile device and an acceleration sensor (gravity sensor (G-sensor)) for detecting acceleration. With these sensors, the mobile devices can detect information such as their location and the acceleration produced therein. Some applications (application software) used in the mobile devices executes a process according to information detected by the sensors mounted in the mobile devices or changes in the information.

Vehicles are equipped with various sensors such as a vehicle speed sensor, an acceleration sensor, and a yaw rate sensor. In the vehicles, travel control etc. are performed based on information detected by the various sensors mounted thereon. The vehicles are also equipped with a navigation system that guides them to a preset destination using their location detected by the GPS sensor and map information. Navigation systems use not only the location information detected by the GPS but also information detected by the vehicle speed sensor, the acceleration sensor, the yaw rate sensor, etc., to accurately detect the location of the vehicle (changes in location of the vehicle). Guidance accuracy of the navigation system is thus improved.

The mobile devices carried by occupants in vehicles often detect the same information as the information detected by the vehicles, and there is room for improvement in the use of the information.

The present disclosure was made in view of the above circumstances, and it is an object of the present disclosure to provide an information control device that enables a portable information processing device to effectively use information detected by a vehicle.

In order to achieve the above object, an information control device according to an aspect of the present disclosure includes:

a portable information processing device including a process execution unit and a detection unit, the process execution unit being configured to, when first information is input, execute a process according to the input first information or a change in the first information and display an image corresponding to the executed process on a display medium, and the detection unit being configured to detect the first information;

an acquisition unit configured to acquire second information detected in a vehicle from the vehicle, the second information being information from which the first information is able to be derived; and an input switching unit configured to input the first information detected by the detection unit to the process execution unit, and when the acquisition unit has acquired the second information, input the second information corresponding to the first information to the process execution unit instead of the first information.

In the information control device of the above aspect, the portable information processing device includes the process execution unit and the detection unit, and the detection unit detects the first information to be used by the process execution unit. The input switching unit inputs the first information detected by the detection unit to the process execution unit. When the first information is input, the process execution unit executes a process according to the input first information or a change in the first information and displays an image corresponding to the executed process on the display medium.

The acquisition unit acquires the second information detected in the vehicle from the vehicle. The second information is information from which the first information is able to be derived. When the acquisition unit has acquired the second information, the input switching unit inputs the second information corresponding to the first information to the process execution unit instead of the first information.

Accordingly, when the acquisition unit can acquire the second information detected in the vehicle, the second information can be used in the portable information processing device. The information detected in the vehicle can therefore be effectively used.

In the information control device according to the above aspect, the acquisition unit may include a transmission unit and a reception unit, the transmission unit being configured to transmit a signal at predetermined intervals via a wireless communication unit to transmit the first information, and the reception unit being configured to receive the signal transmitted from the transmission unit to acquire the second information, and the input switching unit may include, when the reception unit is receiving the signal transmitted from the transmission unit, performing switching in such a manner that the second information according to the received signal is input to the process execution unit.

In the information control device according to the above aspect, the input switching unit may include a signal determination unit configured to determine, based on whether the reception unit is receiving the signal at the predetermined intervals, whether the received signal is stable, and a switching unit configured to, when the signal determination unit determines that the received signal is stable, perform switching in such a manner that the second information is input to the process execution unit.

In the information control device according to the above aspect, the first information and the second information may include location information or information that is able to handle an amount of movement, the amount of movement being an amount of change in the location information within a predetermined period of time.

As described above, according to the present disclosure, when the second information from which the first information can be derived has been detected in the vehicle, the second information can be acquired. The second information can therefore be used by the portable information processing device including the process execution unit configured to execute a process according to the first information. This is advantageous in that the second information detected in the vehicle can be effectively used.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flow chart showing the outline of the operation of the information control device.

DETAILED DESCRIPTION OF EMBODIMENTS

Figure 1:
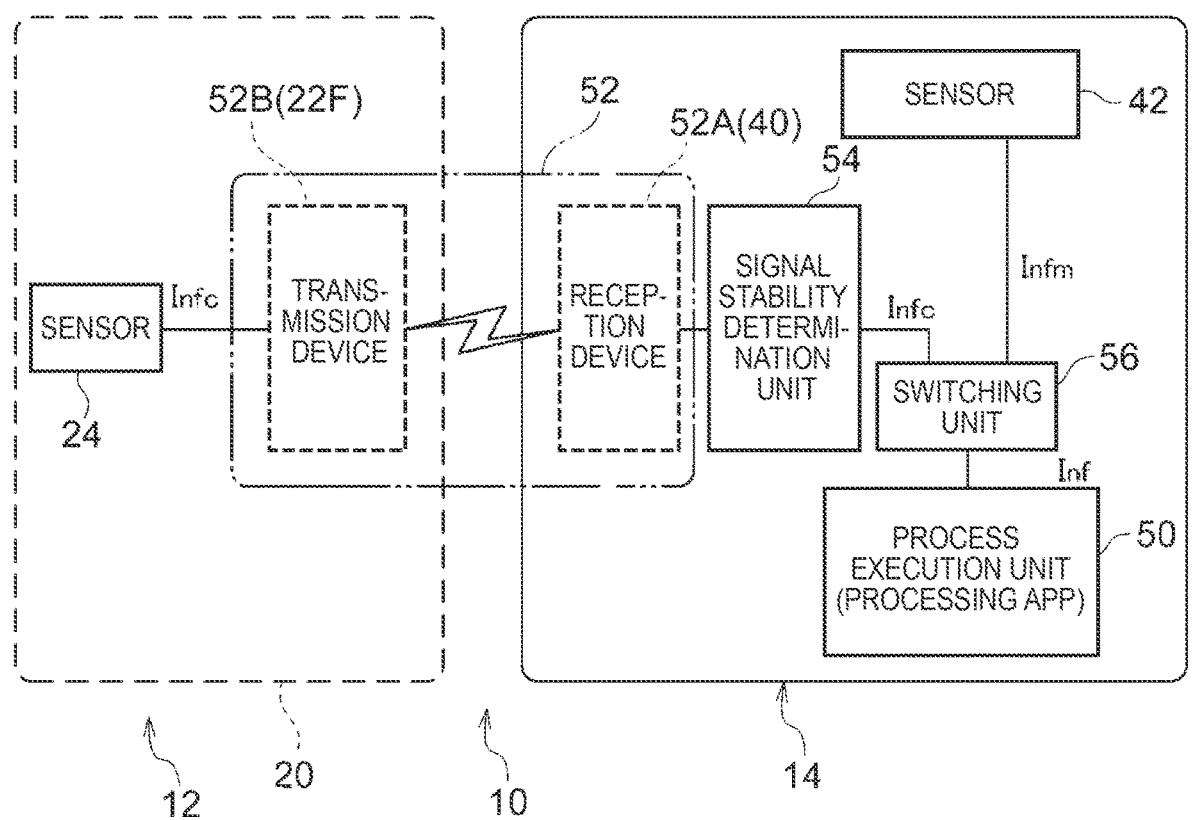
FIG. 1 is a functional block diagram showing an example of an information control device according to this embodiment.

Hereinafter, an example of the embodiment of the present disclosure will be described in detail with reference to the drawings. An information control device 10 according to the present embodiment is configured between a vehicle 12 and a mobile device 14 such as a smartphone or a personal digital assistant (PDA) as a portable information processing device brought into a vehicle cabin. FIG. 1 shows a functional block diagram of a schematic configuration of an information control device 10 according to the present embodiment, and FIG. 2 shows a schematic configuration diagram of main parts of a vehicle 12 and a mobile device 14.

A vehicle 12 according to the present embodiment is an automobile such as a standard-sized car that is driven by the driving force of a driving source. The vehicle 12 may be a reciprocating locomotive vehicle having an engine as a drive source, a hybrid electric vehicle (HEV) having an engine and an electric motor (electric motor), a plug-in hybrid electric vehicle (PHEV), or an electric vehicle instead of the engine. A battery electric vehicle (BEV) with a motor is applicable. Vehicle 12 may also be a fuel cell electric vehicle (FCEV).

Figure 2:
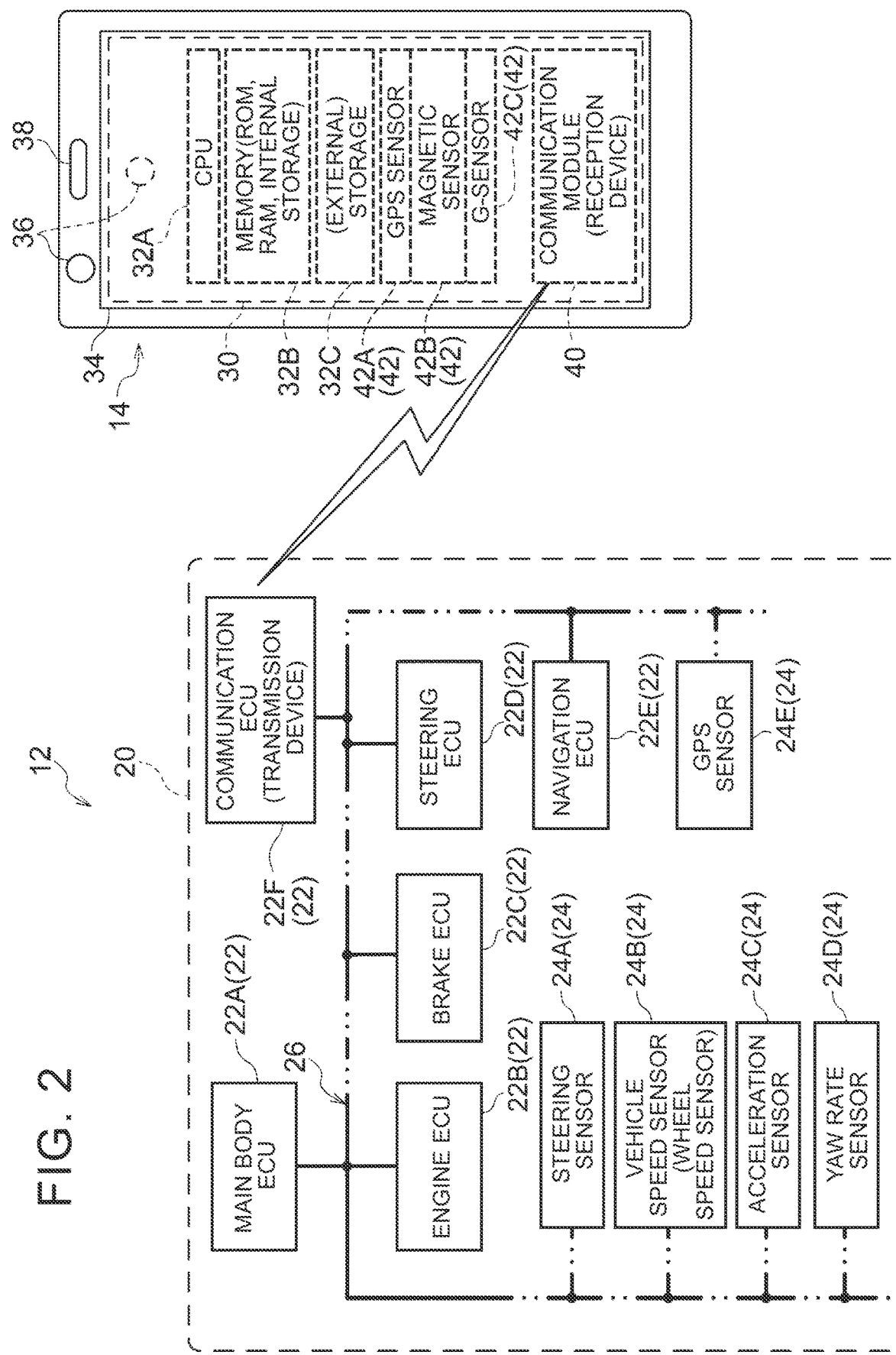
FIG. 2 is a schematic configuration diagram of the main parts of the vehicle and mobile device.

As shown in FIG. 2, the vehicle 12 is formed with a control system 20 for performing various controls such as travel control. The control system 20 includes a plurality of Electronics Control Units (ECUs) 22, a plurality of sensors 24 as a vehicle-side detection unit for detecting the driving state and driving environment of the vehicle 12, and an in-vehicle network 26. Various actuators (not shown) as objects to be controlled are electrically connected to the ECUs 22.

The ECUs 22 of the control system 20 include, for example, a main body ECU 22A, an engine ECU 22B, a brake ECU 22C, a steering ECU 22D, a navigation ECU 22E, and a communication ECU 22F. The ECU 22 includes a microcomputer to which a CPU, ROM, RAM, non-volatile storage, etc. are connected via a bus, and required functional circuits (not shown). In the ECU 22, the CPU reads a program stored in the ROM and storage and executes the program while developing it in the RAM, thereby realizing functions according to the program.

The sensors 24 mounted on the vehicle 12 include a steering sensor 24A for detecting a steering angle, which is a steering rotation angle, a vehicle speed sensor 24B such as a wheel speed sensor for detecting vehicle speed, an acceleration sensor (G sensor) 24C for detecting acceleration, a yaw rate sensor 24D for detecting rotation angular velocity, and the like are included. The sensors 24 also include a GPS sensor 24E for Global Positioning System (GPS) for detecting the position of the vehicle 12, and the like.

A Controller Area Network (CAN) standard or the like is applied to the in-vehicle network 26, and a plurality of ECUs 22 and a plurality of sensors 24 are electrically connected to the in-vehicle network 26. In the in-vehicle network 26, signals (CAN signals) corresponding to information (control information) for control among the plurality of ECUs 22 and information (sensor information) detected by each sensor 24 are transmitted. The sensor 24 may be connected to the ECU 22 via a network (not shown) conforming to the Local Interconnect Network (LIN) standard.

In the control system 20, each ECU 22 controls the operation of the actuator to be controlled based on sensor information output from the sensor 24, control information from other ECUs 22, and the like. Accordingly, in the control system 20, the plurality of ECUs 22 (22A to 22D) works together to control the running of the vehicle 12 and the like. The navigation ECU 22E also acquires the position information of the vehicle 12 using the GPS sensor 24E, and displays the position (current position) of the own vehicle (vehicle 12) on the map information on a display (not shown). Further, when the destination is set, the navigation ECU 22E sets a travel route from the current position to the destination, and guides the vehicle 12 (own vehicle) to travel along the set travel route. It has functions such as The control system 20 may include an ECU for vehicle air conditioning control, an ECU for acoustic control, and the like, as well as sensors for detecting information applied to air conditioning control, acoustic control, etc., and functions such as air conditioning control and acoustic control. Further, the control system 20 may be configured with Advanced Driver Assistance Systems (ADAS).

The communication ECU 22F is capable of communicating with preset devices using the Wi-Fi standard, the Bluetooth (registered trademark) standard, the Bluetooth Low Energy (registered trademark, BLE) standard, or the like. The communication ECU 22F can perform communication by connecting to a predetermined line network (external network) by a wireless method. The communication ECU 22F is capable of transmitting various information acquired via a required server connected to the network outside the vehicle to each ECU 22 via the vehicle network 26. Information transmitted via the in-vehicle network 26 can be output from the communication ECU 22F to a required server via the network outside the vehicle.

On the other hand, the mobile device 14 is provided with a CPU 32A and a memory 32B on a motherboard 30, and a non-volatile storage (external storage such as a micro SD card, etc.) 32C is electrically connected to the CPU 32A. ROM, RAM and non-volatile storage (internal storage) are used for the memory 32B. The mobile device 14 also includes a touch panel display 34 as a display medium and an operation unit, a camera module 36, a speaker 38, and a microphone (not shown). The mobile device 14 also includes a communication module 40 etc as a wireless communication unit and reception unit.

The mobile device 14 is activated by the CPU 32A executing the OS stored in the memory 32B. The CPU 32A executes a program (application: application software) stored in the memory 32B or the storage 32C, thereby realizing a function corresponding to the application.

As a result, the mobile device 14 uses the camera module 36 to realize a still image and moving image shooting function. In addition, the mobile device 14 is connected to a wireless telephone network (line network) by applying a required communication standard such as the 4G standard or the 5G standard to the communication module 40. In the mobile device 14, since the communication program is activated, telephone functions such as a voice call using the speaker 38 and the microphone and a video call using the display 34, the camera module 36, the speaker 38 and the microphone are realized.

The mobile device 14 includes a sensor 42 as a detection unit. As the sensor 24, at least one of a GPS sensor 42A, a magnetic sensor 42B, and an acceleration sensor (G sensor) 42C is used. The sensor information detected by the sensor 42 is information used for an application executed on the mobile device 14 (the sensor 42 detects information used for the application). Various sensors such as a gyroscope can be applied to the sensor 42.

In the mobile device 14, an application (processing application) using sensor information Inf as first information detected by the sensor 42 is stored in the memory 32B (or storage 32C). As shown in FIG. 1, in the mobile device 14, the processing execution unit 50 is configured by activating (executing) a processing application.

When the sensor information Infm output from the sensor 42 is input, the processing execution unit 50 treats the sensor information Infm as the sensor information Inf and executes processing according to the sensor information Inf. For example, the processing execution unit 50 receives sensor information Inf (Infm) requested at predetermined time intervals, and executes processing according to the sensor information Inf.

In addition, the processing execution unit 50 displays on the display 34 an image corresponding to the executed process or an image that changes according to the executed process. At this time, when a desired operation (touch operation) is performed on the image displayed on the display 34, the processing execution unit 50 executes a process corresponding to the touch operation or displays an image according to the touch operation. It may include performing processing such as changing the image.

As the sensor information Inf (Infm) used in the processing execution unit 50 (processing application), the positional information detected by the GPS sensor 42A and the change in the positional information within a preset time such as a unit time are used. The amount of movement obtained can be applied. Further, the processing execution unit 50 calculates the movement amount and movement speed of the mobile device 14 from the sensor information Inf detected by the GPS sensor 42A, the magnetic sensor 42B, or the G sensor 42C, and performs various operations based on the calculation result etc. can be applied.

A navigation program can be applied as a processing application (processing application software) for configuring the processing execution unit 50. In addition, the processing execution unit 50 (processing application) can have a configuration in which the content displayed on the display 34 changes or the content emitted from the speaker 38 or the like changes according to the amount and speed of movement of the mobile device 14 and the game that progresses according to the amount and speed of movement of the mobile device 14.

On the other hand, in the mobile device 14, an information control program is stored in the memory 32B (or storage 32C). In the mobile device 14, the functions of the information control device 10 are realized by activating the information control program. The information control device 10 includes an acquisition unit 52 as an acquisition unit, a signal stability determination unit 54 as a signal stability determination unit, and a switching unit 56 as a switching unit. The signal stability determination unit 54 and the switching unit 56 function as an input switching unit.

In the control system 20 of the vehicle 12, information detected by the sensors 24 (vehicle speed sensor 24B, acceleration sensor 24C, yaw rate sensor 24D, GPS sensor 24E, etc.) is transmitted through an in-vehicle network 26.

The acquisition unit 52 acquires the sensor information Infc corresponding to the sensor information Inf requested by the processing execution unit 50 from the control system 20 of the vehicle 12. Information corresponding to the sensor information Infm (or sensor information Inf) used by the processing execution unit 50 (for example, information similar to the sensor information Infm) or information from which the sensor information Infm can be derived is applied to the sensor information Infc.

For example, when the processing execution unit 50 uses location information detected by the GPS sensor 42A to perform processing according to the amount of movement of the mobile device 14 obtained from changes in the location information, the sensor information Infc includes the GPS sensor of the vehicle 12. Position information detected by 24E, vehicle speed detected by vehicle speed sensor 24B, or the like can be applied.

In the acquisition unit 52, the communication module 40 of the mobile device 14 functions as a reception device 52A, and the communication ECU 22F of the control system 20 functions as a transmission device 52B. The acquisition unit 52 performs wireless communication between the reception device 52A and the transmission device 52B using the Wi-Fi standard, the Bluetooth (registered trademark) standard, the Bluetooth Low Energy (registered trademark, BLE) standard, or the like. As a result, (the control system 20 of) the vehicle 12 and the mobile device 14 can communicate with each other when the occupant brings the mobile device 14 into the vehicle cabin.

A transmission device 52B (communication ECU 22F) of the acquisition unit 52 transmits a signal corresponding to information transmitted through the in-vehicle network 26 at time intervals defined by the communication standard. Further, the reception device 52A receives the transmitted signal and reads (extracts) the sensor information Infc corresponding to the sensor information Inf requested by the processing execution unit 50. Note that the acquisition unit 52 may acquire the sensor information Infc transmitted over the in-vehicle network 26 by communicating (transmitting and receiving signals) between the communication ECU 22F and the communication module 40.

The signal stability determination unit 54 determines whether or not the reception device 52A can stably receive the signal transmitted from the transmission device 52B. The signal stability determination unit 54 determines whether the reception device 52A is receiving a signal at prescribed time intervals (time intervals at which the transmission device 52B transmits a signal). When the reception device 52A continues to receive the signal at the prescribed time intervals, the signal stability determination unit 54 determines that the sensor information Infc is being received stably. When the signal stability determination unit 54 determines that the sensor information Infc is stably received, the signal stability determination unit 54 outputs the sensor information Infc included in the received signal to the switching unit 56.

Further, in the reception device 52A, when the signal is not received at the specified time interval due to interruption of signal reception, the signal stability determination unit 54 determines that the sensor information Infc is not stably received. When the signal stability determination unit 54 determines that the sensor information Infc is not stably received, the signal stability determination unit 54 stops outputting the sensor information Infc to the switching unit 56. Further, when the signal stability determination unit 54 determines that the sensor information Infc has started to be received stably, the signal stability determination unit 54 resumes outputting the sensor information Infc to the switching unit 56.

When the sensor information Infc is input from the signal stability determination unit 54 to the switching unit 56, the switching unit 56 outputs the sensor information Infc to the processing execution unit 50 as the sensor information Inf. Further, when the signal is no longer input from the signal stability determination unit 54 to the switching unit 56 (the input is interrupted), the switching unit 56 outputs the sensor information Infm input from the sensor 42 to the processing execution unit 50 as the sensor information Inf. Accordingly, the processing execution unit 50 can execute processing using the sensor information Infm detected by the sensor 42 or the sensor information Infc detected by the sensor 24 in the vehicle 12 as the sensor information Inf.

Next, actions of the present embodiment will be described.

The vehicle 12 is provided with a vehicle speed sensor 24B, an acceleration sensor 24C, a yaw rate sensor 24D, a GPS sensor 24E, and the like. In the control system 20, information (sensor information) detected by the vehicle speed sensor 24B, the acceleration sensor 24C, the yaw rate sensor 24D, the GPS sensor 24E, etc. is transmitted through the in-vehicle network 26. In the control system 20, the ECU 22 controls the operation of the actuator to be controlled based on sensor information output from the sensor 24, control information from other ECUs 22, and the like, thereby controlling the running of the vehicle 12.

The mobile device 14 is provided with sensors 42 (GPS sensor 42A, magnetic sensor 42B and G sensor 42C). In the mobile device 14, the processing execution unit 50 is operated (the processing application is started), so that the processing using the sensor information Infm detected by the sensor 42 designated in the processing execution unit 50 is executed.

On the other hand, when an occupant carrying the mobile device 14 gets in the vehicle 12, the sensor 24 detects information similar to the sensor information Infm detected by the sensor 42 of the mobile device 14, or information from which the sensor information Infm can be derived. It is detected as sensor information Infc. The information control device 10 makes the sensor information Infc detected in the vehicle 12 available in the mobile device 14.

Here, the operation of the information control device 10 will be described with reference to FIGS. 3 to 5.

Figure 3:
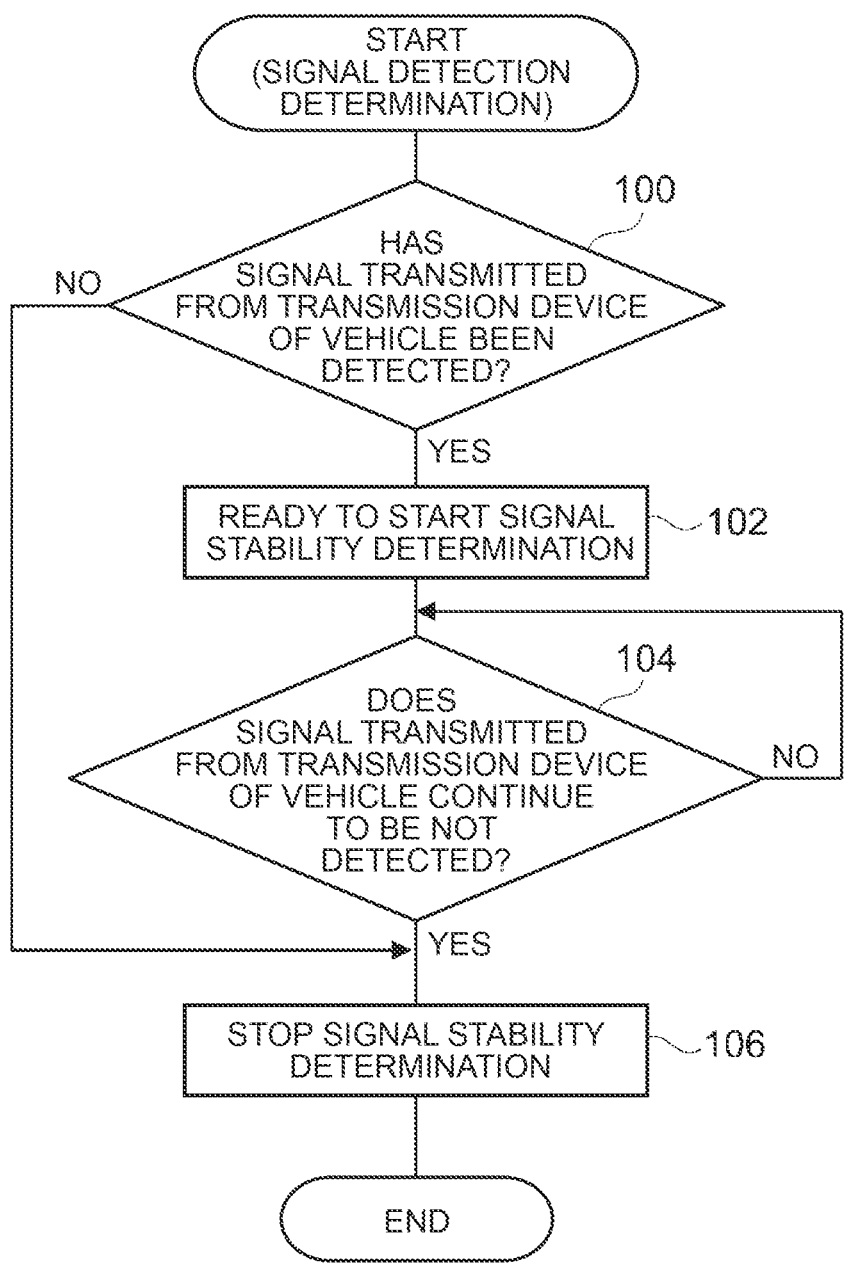
FIG. 3 is a flow chart showing an outline of start/stop of the information control device.
Figure 4:
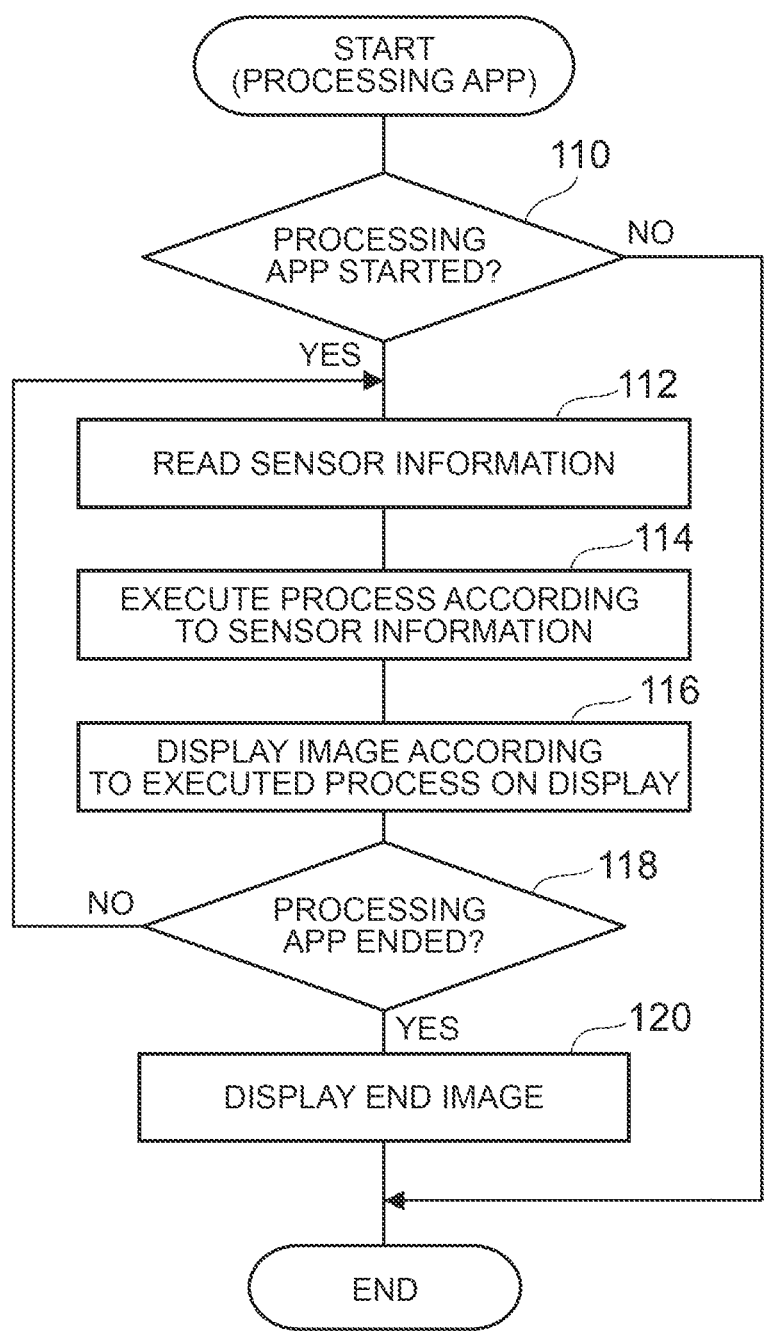
FIG. 4 is a flow diagram illustrating an example of the operation of a processing application on a mobile device.

FIG. 3 is a flowchart showing an outline of the start/stop of the signal stability determination process in the information control device 10, FIG. 4 is a flowchart showing an outline of the operation of the processing application, and FIG. 5 is a flowchart showing an outline of the started signal stability determination process.

In the vehicle 12, an ignition switch (not shown) is turned on to enable the vehicle 12 to run, so that the control system 20 operates and communication between the communication ECU 22F and the mobile device 14 becomes possible. As a result, the processing in FIG. 3 is executed in the mobile device 14 carried by the occupant in the vehicle.

In the first step 100 of this flowchart, the information control device 10 checks whether or not the reception device 52A has detected (received) the transmission signal from the transmission device 52B (communication ECU 22F) of the vehicle 12. When the reception device 52A is receiving the signal from the transmission device 52B, the information control device 10 makes an affirmative determination in step 100, proceeds to step 102, and enables signal stability determination processing to be started.

After that, in step 104, the information control device 10 checks whether or not the transmission signal from the transmission device 52B remains undetected. When the non-detection state of the transmission signal does not continue (when the transmission signal can be continuously received), the information control device 10 continues the state in which the signal stability determination can be started (the negative determination is continued in step 104).

In addition, if the control system 20 stops due to the ignition switch being turned off, or if an occupant carrying the mobile device 14 gets out of the vehicle, the reception device 52A cannot receive the transmission signal of the transmission device 52B (the transmission signal of the transmission device 52B is interrupted). In this case, the information control device 10 makes an affirmative determination in step 104 and proceeds to step 106.

At step 106, the information control device 10 stops the signal stability determination (puts in a start-disabled state). If the communication ECU 22F is not installed in the vehicle 12 or the control system 20 is not operating, the information control device 10 makes a negative determination in step 100 and proceeds to step 106 to determine signal stability. Stop.

On the other hand, at step 110 in the flowchart of FIG. 4, the mobile device 14 confirms whether or not the processing application (processing execution unit 50) has been started. In the mobile device 14, affirmative determination is made in step 110 when the processing application is activated and the processing execution unit 50 is operated.

The processing execution unit 50 reads the sensor information Inf at step 112. At this time, when the sensor information Infm of the sensor 42 is input, the processing execution unit 50 reads the sensor information Infm as the sensor information Inf.

Next, the processing execution unit 50 executes a process corresponding to the sensor information Inf (or changes in the sensor information Inf) in step 114, and displays an image corresponding to the executed process on the display 34 in step 116. Further, in step 118, the processing execution unit 50 confirms whether or not the processing application has been terminated. If the processing application has not been terminated, the processing execution unit 50 makes a negative determination in step 118, and repeats the processing according to the sensor information Inf.

Further, when the processing application is ended, the processing execution unit 50 makes an affirmative determination in step 118, proceeds to step 120, displays a predetermined end image, for example, on the display 34, and ends the operation.

On the other hand, in the information control device 10, when the signal stability determination can be activated in step 102 of FIG. 3, the signal stability determination processing shown in FIG. 5 and the switching processing are executed.

As shown in the flowchart of FIG. 5, in step 130, the information control device 10 confirms whether or not the processing application has been started (the processing execution unit 50 has been operated). When the processing application is activated and the processing execution unit 50 is operated, the information control device 10 makes an affirmative determination in step 130 and proceeds to step 132.

The processing application can set whether to use the sensor information Infc detected by the sensor 24 of the vehicle 12. In step 132, the information control device 10 checks whether the processing application is set to use the sensor information Infc detected by the sensor 24 of the vehicle 12.

The information control device 10 makes an affirmative determination in step 132 if the processing application has been set in advance to use the sensor information Infc. As a result, the information control device 10 proceeds to step 134 and signal stability determination is activated.

Note that if the processing application has not been started, the information control device 10 makes a negative determination in step 130. Further, when the use of the sensor information Infc is not set in the processing application, the information control device 10 makes a negative determination in step 132. If a negative determination is made in step 130 or step 132, the information control device 10 proceeds to step 148, and the switching unit 56 sets the sensor information Infm of its own device (mobile device 14) to be input to the processing application.

When the signal stability determination is activated, the signal stability determination unit 54 operates, and the signal stability determination unit 54 receives the signal (vehicle signal) transmitted from the transmission device 52B in step 136 (received by the reception device 52A). At step 138, the signal stability determination unit 54 determines whether the received signal is stable. Whether or not the received signal is stable is determined by, for example, whether or not the reception device 52A can receive the signal at regular time intervals while the transmission device 52B is transmitting signals at regular time intervals.

Here, when there are electrical or magnetic obstacles around the mobile device 14, when the direction of the mobile device 14 changes frequently, when the operation of the transmission device 52B (communication ECU 22F) is unstable, etc., the intervals at which the signal is received by the reception device 52A may be irregular.

The signal stability determination unit 54 makes a negative determination in step 138 and proceeds to step 140 when the interval at which the reception device 52A receives the signal becomes irregular. In step 140, the signal stability determination unit 54 stops outputting the sensor information Infc included in the signal received by the reception device 52A to the switching unit 56. As a result, the switching unit 56 outputs the sensor information Infm detected by the sensor 42 of its own device to the processing execution unit 50. When the sensor information Infm is input, the processing execution unit 50 performs processing using the sensor information Infm as the sensor information Inf.

On the other hand, when the reception device 52A is receiving the signal at the prescribed time intervals, the signal stability determination unit 54 makes an affirmative determination in step 138 and proceeds to step 142. In this step 142, the signal stability determination unit 54 outputs the sensor information Infc included in the signal received by the reception device 52A to the switching unit 56. Thereby, the switching unit 56 outputs the sensor information Infc detected by the sensor 24 of the vehicle 12 to the processing execution unit 50. When the sensor information Infc is input, the processing execution unit 50 performs processing using the sensor information Infm as the sensor information Inf.

In step 144, the signal stability determination unit 54 confirms whether the processing application has ended and the operation of the processing execution unit 50 has ended. If the operation of the processing execution unit 50 continues, the signal stability determination unit 54 makes a negative determination in step 144 and continues the signal stability determination process.

Further, when the operation of the processing execution unit 50 is completed, the signal stability determination unit 54 makes an affirmative determination in step 144, proceeds to step 146, and ends the signal stability processing. Accordingly, in step 148, the information control device 10 sets the switching unit 56 so that the sensor information Infm of the device itself (the mobile device 14) is input to the processing application.

In this way, when the information control device 10 can acquire the sensor information Infc detected in the vehicle 12, the information control device 10 inputs the sensor information Infc to the processing execution unit 50 instead of the sensor information Infm. Thereby, in the information control device 10, the sensor information Infc detected in the vehicle 12 can be effectively used in the mobile device 14.

Also, the information control device 10 can be provided in the mobile device 14. Accordingly, the mobile device 14 can effectively use the sensor information Infc detected in the vehicle 12 by being brought into the vehicle cabin of the vehicle 12.

In addition, in the present embodiment described above, the vehicle 12 provided with the communication ECU 22F (transmission device 52B) capable of communicating with the mobile device 14 in the control system 20 has been described as an example. However, even when the vehicle is not provided with the communication unit in the in-vehicle network, it is sufficient to provide a communication unit functioning as the transmission device 52B in the communication network.

Further, in this embodiment, the mobile device 14 is provided with the functions of the information control device 10. However, the information control device may be configured so that the sensor information detected by the detection unit (sensor) mounted on the vehicle can be used in the portable information processing device. The function of the information control device may be installed in the vehicle.

What is claimed is:

1. An information control device for a mobile device of an occupant of a vehicle, the mobile device including a first sensor and a display device, the vehicle including a second sensor, the information control device comprising:
a processor communicatively coupled with the vehicle, the first sensor, and the display device, the processor including a process execution unit, an acquisition unit, an input switching unit, and a signal determination unit, wherein
the acquisition unit is configured to
acquire, from the mobile device, first information detected by the first sensor, the first information including location information, travel distance information, and velocity information of the mobile device; and
receive, from the vehicle via wireless network, a signal including second information detected by the second sensor, the second information including location information, travel distance information, and velocity information of the vehicle,
the signal determination unit is configured to determine whether the signal is received at predetermined time intervals,
the input switching unit is configured to
input the acquired first information to the process execution unit; and
in a case where the processor receives the signal transmitted from the vehicle at the predetermined time intervals, input the acquired second information to the process execution unit instead of the acquired first information, and
the process execution unit is configured to
in a case where the first information is input, display a first image via the display device, the first image indicating the input first information; and
in a case where the second information is input, display a second image via the display device, the second image indicating the input second information.

2. The information control device according to claim 1, wherein the processor is configured to receive the signal transmitted from the vehicle in a case where the mobile device is carried into the vehicle by the occupant.

* * * * *